United States Patent
Couwenberg et al.

(10) Patent No.: US 7,339,326 B2
(45) Date of Patent: Mar. 4, 2008

(54) DC/AC CONVERTER FOR SUPPLYING TWO GAS DISCHARGE LAMPS

(75) Inventors: Winston Donald Couwenberg, Eindhoven (NL); Dolf Henricus Jozef Van Casteren, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 258 days.

(21) Appl. No.: 10/539,382

(22) PCT Filed: Dec. 2, 2003

(86) PCT No.: PCT/IB03/25762

§ 371 (c)(1),
(2), (4) Date: Jun. 15, 2005

(87) PCT Pub. No.: WO2004/057933

PCT Pub. Date: Jul. 8, 2004

(65) Prior Publication Data

US 2007/0007901 A1 Jan. 11, 2007

(30) Foreign Application Priority Data

Dec. 20, 2002 (EP) .................................. 02080505

(51) Int. Cl.
*H05B 37/02* (2006.01)

(52) U.S. Cl. .................. 315/223; 315/224; 315/DIG. 7
(58) Field of Classification Search ................ 315/224, 315/223, DIG. 5, DIG. 7
See application file for complete search history.

(56) References Cited

U.S. PATENT DOCUMENTS

| 4,734,624 A * | 3/1988 | Nagase et al. .............. 315/243 |
| 5,875,103 A | 2/1999 | Bhagwat et al. |
| 6,278,245 B1 * | 8/2001 | Li et al. ..................... 315/307 |
| 2002/0190665 A1* | 12/2002 | Sun ........................... 315/224 |

FOREIGN PATENT DOCUMENTS

| EP | 0395159 | * 10/1990 |
| EP | 0395159 A1 | 10/1990 |
| EP | 0567108 A1 | 10/1993 |
| EP | 0395159 B1 | 3/1995 |

OTHER PUBLICATIONS

ISR, International Search Report PCT/IB03/05762, Feb. 3, 2004.

* cited by examiner

*Primary Examiner*—David H. Vu

(57) ABSTRACT

An DC/AC converter for supplying two gas discharge lamps, includes a double bridge configuration of four switches and a controller. The controller controls the conducting periods of the switches with a duty cycle which is variable. By control of the conducting periods of the switches, a proper control of the energy supplied to the lamps is obtained.

12 Claims, 1 Drawing Sheet

DC/AC CONVERTER FOR SUPPLYING TWO GAS DISCHARGE LAMPS

Figure 1:
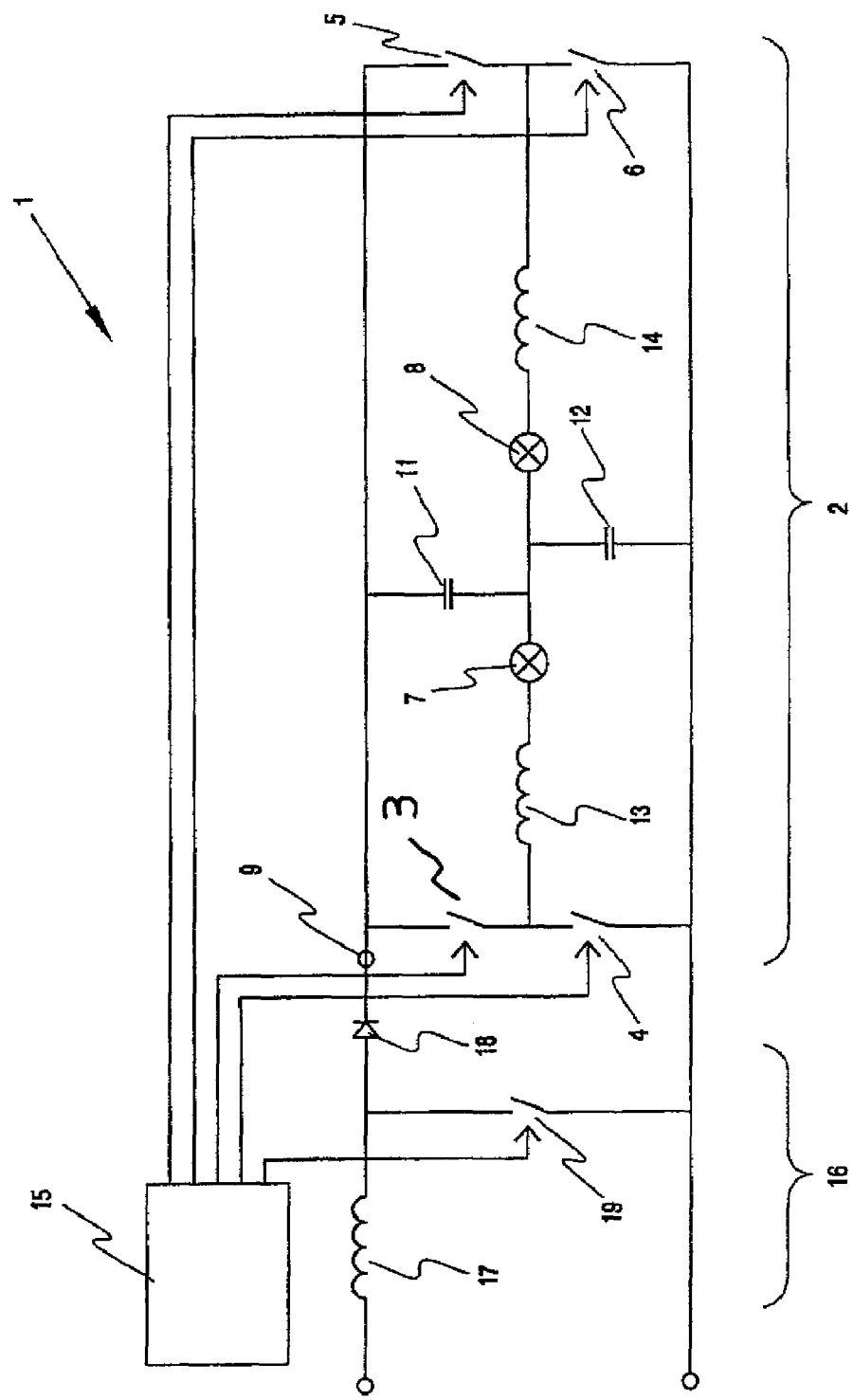

The invention relates to a DC/AC converter for supplying two gas discharge lamps, comprising a pair of input terminals for supplying a DC voltage, a first series circuit interconnecting the input terminals, comprising a first switching element and a second switching element, a second series circuit interconnecting the input terminals, comprising a third switching element and a fourth switching element, a third series circuit interconnecting the input terminals, comprising a first capacitor and a second capacitor with substantially equal capacitance, a first gas discharge lamp connected between the junction between the first and the second switch element and the junction between the two capacitors, a second gas discharge lamp connected between the junction between the third and the fourth switch element and the junction between the two capacitors, wherein an inductor is connected in series with each of the lamps and a control circuit for controlling the first to fourth switch elements, and which is adapted to avoid the simultaneously conducting of the first and second switch elements the third and the fourth switch elements respectively.

Such a DC/AC converter is disclosed in EP-A-0 395 159.

Although this prior art converter is primarily adapted to supply TL-lamps it is also suitable to supply high pressure gas discharge lamps (HID-lamps).

Particularly in the field of HID lamps there exists the need to control the power fed to the lamps, not only for the control of the light output but primarily to be able to start this kind of lamps. Here it is noted that the 'take over' of said lamps between the ignition and the steady state usually requires special provisions. With the ability to control the power supplied to the lamp, starting of the lamp only requires a special ignition circuit.

Thus there exists a wish to provide lamps with a variable controllable power.

The aim of the invention is to provide such a DC/AC converter of the kind mentioned above of which the power supplied to the lamps can be controlled.

This aim is reached in that the control element is adapted to control the conducting periods of the switches with a duty cycle which is variable.

As stated before, the control of the power supplied to the lamps is important, in particular for the starting of the lamp. By control of the conducting periods of the switch elements a proper control of the energy supplied to the lamps is obtained. Of course care should be taken to avoid the simultaneous closure of the first and second switch elements and of the third and fourth switch elements to avoid short circuits.

Although control of the power by amending the duration of the switched on times is known per se, it is supposed to be novel in the field of double bridges wherein tuned circuits are present.

According to a preferred embodiment, the control unit is adapted to control the duty cycle of the first and second switch elements simultaneously and to control the duty cycle of the third and fourth switch elements simultaneously.

This facility offers the possibility of independent control of the power supplied to each of the lamps. This is not only important for control of the light output of the lamps, but also for the starting procedure. It is conceivable that both lamps present in the circuit have more or less different properties, so that ignition of one lamp may take place earlier than ignition of the other lamp. By the independent control of the power supplied to each of the lamps, the 'take over' from the ignition to the steady state is adaptable to the processes taking place in each of the lamps.

When using HID lamps acoustical resonance may lead to destruction of the lamp. As for lamps of the most common types acoustical resonance often takes place in the frequency bands between 300 Hz and 1000 Hz, it is attractive to avoid those frequencies.

Therefore a preferred embodiment provides the feature that the control unit is adapted to control the switches with a frequency in the band between 140 Hz and 170 Hz.

According to another preferred embodiment a series circuit of an inductor and a diode is connected between the input terminal and the first switching element, wherein a fifth switching element is connected between the junction of the diode and the inductor and the second input terminal and the fifth switch element is controlled by the control circuit.

This circuit provides an extra control for the voltage to be supplied to the double bridge circuit. This extra control function may be used for keeping the voltage supplied to the double bridge as constant as possible, for instance in the case of a varying supply voltage.

A last preferred embodiment teaches the feature that the frequency of the switching of the fifth switch element is at least an order of magnitude higher than that of the frequency of the first to fourth switching elements. This avoids mutual interference of both power conversion systems.

Subsequently the present invention will be elucidated with the help of the drawing (FIG. 1), showing a diagram of a converter according to the present invention.

The converter 1 comprises a double bridge circuit 2 with four switch elements 3, 4, 5, 6, which may be formed by FETs, GTOs or other controllable semiconductor switch elements. The junctions between the switch elements 3, 4 and 5, 6 respectively are connected to a pair of HID lamps 7, 8 connected in series.

The double bridge circuit comprises a first input 9 connected to the positive power supply and a second input 10 connected to ground.

A first capacitor 11 is connected between the first input 9 and the junction between the HID lamps 7, 8 and a second capacitor 12 is connected between the second input 10 and the junction between the HID lamps 7,8. In series with each of the lamps 7,8 an inductor 13, 14 respectively is connected.

Each of the switch elements 3, 4, 5, 6 is controlled by a control circuit 15. The circuit as described so far functions as is described in the above referenced EP-A-0 395 159.

However the present circuit is especially adapted to supply HID lamps which are prone to acoustical resonance, and which may lead to destruction of the lamps. To avoid this phenomenon, the control circuit is adapted to control the switch elements with a frequency wherein acoustic resonance does not take place. This implies that frequencies between 500 Hz and 1000 Hz, are avoided as it is in those frequency bands that HID lamps of common types are most prone to acoustical resonance. Of course it is possible to use higher frequencies, for instance above 1000 Hz, the more as this would lead to smaller sizes of the components, but this may lead to unwanted emitting of signals interfering with communication systems operating in those frequency bands.

The voltage of power supply may be subjected to fluctuations, which, without further measures, may lead to fluctuations of the light flux emitted by the HID lamps 7,8.

To avoid those fluctuations the converter according to the present invention provides a voltage stabilizing circuit 16, which is connected between the power supply connection and the inputs of the double bridge circuit. The voltage stabilizing circuit comprises an inductor 17 and a diode 18 connected in series between the power supply connection and the input of the double bridge circuit. A fifth switch element 19 is connected between the junction between the inductor 17 and the diode 18 and ground. The fifth switch element 19 is also controlled by the control circuit 15. Just as the first to fourth switch elements 3-6, the fifth switch element 19 is be formed by a controlled semiconductor.

By controlling the duty cycle of the switch element 19, the voltage level at the input of the double bridge circuit can be stabilized. Herein it is important to choose the frequency of the fifth switch element such that mutual interference with the double bridge circuit is avoided. Therefore a frequency at least one order of magnitude higher than of the double bridge circuit is chosen.

It will be clear that the semiconductor switch elements will be provided with a by pass diode to avoid undue voltage stress on the junction of the semiconductor switch element, if the construction of such switch element makes this appropriate.

It will also be clear to a skilled man that numerous amendments can be made to the described embodiment without departing from the scope of the invention.

The invention claimed is:

1. An DC/AC converter for supplying two gas discharge lamps, comprising:
   a pair of input terminals for supplying a DC voltage;
   a first series circuit interconnecting the input terminals, comprising a first switching element and a second switching element;
   a second series circuit interconnecting the input terminals, comprising a third switching element and a fourth switching element;
   a third series circuit interconnecting the input terminals, comprising two compacitors with substantially equal capacitance;
   a first gas discharge lamp connected between a junction between the first and the second switching elements and the junction between the two capacitors;
   a second gas discharge lamp connected between the junction between the third and the fourth switching elements and the junction between the two capacitors;
   wherein an inductor is connected in series with each of the lamps; and
   control circuit for controlling the first to fourth switching elements, and which is adapted to avoid the simultaneously conducting of the first and second switching elements, the third and the fourth switching elements respectively,
   wherein the control circuit is adapted to control conducting periods of the switches with a duty cycle which is variable,
   wherein a series circuit of a further inductor and a diode is connected between one of the input terminals and the first switching element, and wherein a fifth switching element is connected between a junction of the diode and the further inductor and another of the input terminals, the fifth switching elements being controlled by the control circuit.

2. The DC/AC converter as claimed in claim 1, wherein the control circuit is adapted to control the duty cycle of the first and second switching elements simultaneously and to control the duty cycle of the third and fourth switching elements simultaneously.

3. The DC/AC converter as claimed in claim 1, wherein the control circuit is adapted to control the switching elements with a frequency between 140 Hz and 170 Hz.

4. The DC/AC converter as claimed in claim 1, wherein a frequency of switching of the fifth switching element is at least an order of magnitude higher than a switching frequency of the first to fourth switching elements.

5. A converter for supplying two lamps, comprising:
   a first input terminal and a second input terminal for supplying a voltage;
   switching elements interconnecting the first input terminal and the second input terminal;
   two capacitors interconnecting the first input terminal and the second input terminal;
   a first lamp connected between a junction between first and second switches of the switching elements and a junction between the two capacitors;
   a second lamp connected between a junction between third and fourth switches of the switching elements and the junction between the two capacitors; and
   a controller adapted to control the switching elements;
   wherein a series circuit of an inductor and a diode is connected between the first input terminal and the first switch, and wherein a fifth switch is connected between a junction of the diode and the inductor and the second input terminal, the fifth switch being controlled by the controller.

6. The converter of claim 5, wherein the two capacitors have substantially equal capacitance.

7. The converter of claim 5, further comprising an additional inductor connected in series with the first lamp, and a further inductor connected in series with the second lamp.

8. The converter of claim 5, wherein the controller is further adapted to avoid simultaneously conduction of the first and second switches, and to avoid simultaneously conduction of the third and the fourth switches.

9. The converter of claim 5, wherein the controller is further adapted to control conducting periods of the switching elements with a duty cycle which is variable.

10. The converter of claim 5, wherein the controller is further adapted to control a duty cycle of the first and second switches simultaneously, and to control a duty cycle of the third and fourth switches simultaneously.

11. The converter of claim 5, wherein the controller is further adapted to control the switching elements with a frequency between 140 Hz and 170 Hz.

12. The converter of claim 5, wherein a frequency of switching of the fifth switch is at least an order of magnitude higher than a switching frequency of the first to fourth switches.

* * * * *